(12) United States Patent
Wu

(10) Patent No.: US 9,205,386 B2
(45) Date of Patent: Dec. 8, 2015

(54) GAS INJECTION DEVICE HAVING CHECK VALVE

(71) Applicant: Chao-Chung Wu, Taichung (TW)

(72) Inventor: Chao-Chung Wu, Taichung (TW)

( * ) Notice: Subject to any disclaimer, the term of this patent is extended or adjusted under 35 U.S.C. 154(b) by 155 days.

(21) Appl. No.: 14/192,716

(22) Filed: Feb. 27, 2014

(65) Prior Publication Data

US 2015/0238910 A1 Aug. 27, 2015

(51) Int. Cl.
*B01F 3/04* (2006.01)
*F16K 15/00* (2006.01)
*C02F 1/78* (2006.01)
*B01F 5/04* (2006.01)

(52) U.S. Cl.
CPC ............ *B01F 3/0446* (2013.01); *B01F 3/04255* (2013.01); *B01F 5/0486* (2013.01); *C02F 1/78* (2013.01); *F16K 15/00* (2013.01); *B01F 2003/04886* (2013.01)

(58) Field of Classification Search
CPC .... B01F 3/04; B01F 3/04099; B01F 3/04255; B01F 3/0446

USPC ......................... 261/76, 77, DIG. 56, DIG. 75
See application file for complete search history.

(56) References Cited

U.S. PATENT DOCUMENTS 4,562,014 A * 12/1985 Johnson ................. B01D 35/06
261/64.1

* cited by examiner

*Primary Examiner* — Robert A Hopkins

(57) ABSTRACT

A gas injection device is provided. A separation plate is disposed between inlet and outlet ends of a main body. At least one flow hole is disposed around a through hole of the separation plate. Top, middle and bottom sections of a valve body are disposed respectively at the inlet end, through the through hole and at the outlet end. Respective outer diameters of the top and bottom sections are larger than an inner diameter of the through hole, and the largest outer diameter of the bottom section is larger than a smallest inner diameter of the outlet end. A length of the middle section is longer than an axial length of the through hole. An elastic member through the middle section abuts against the separation plate and the bottom section to bias the valve body toward the outlet end and normally unclose the bottom section.

6 Claims, 5 Drawing Sheets

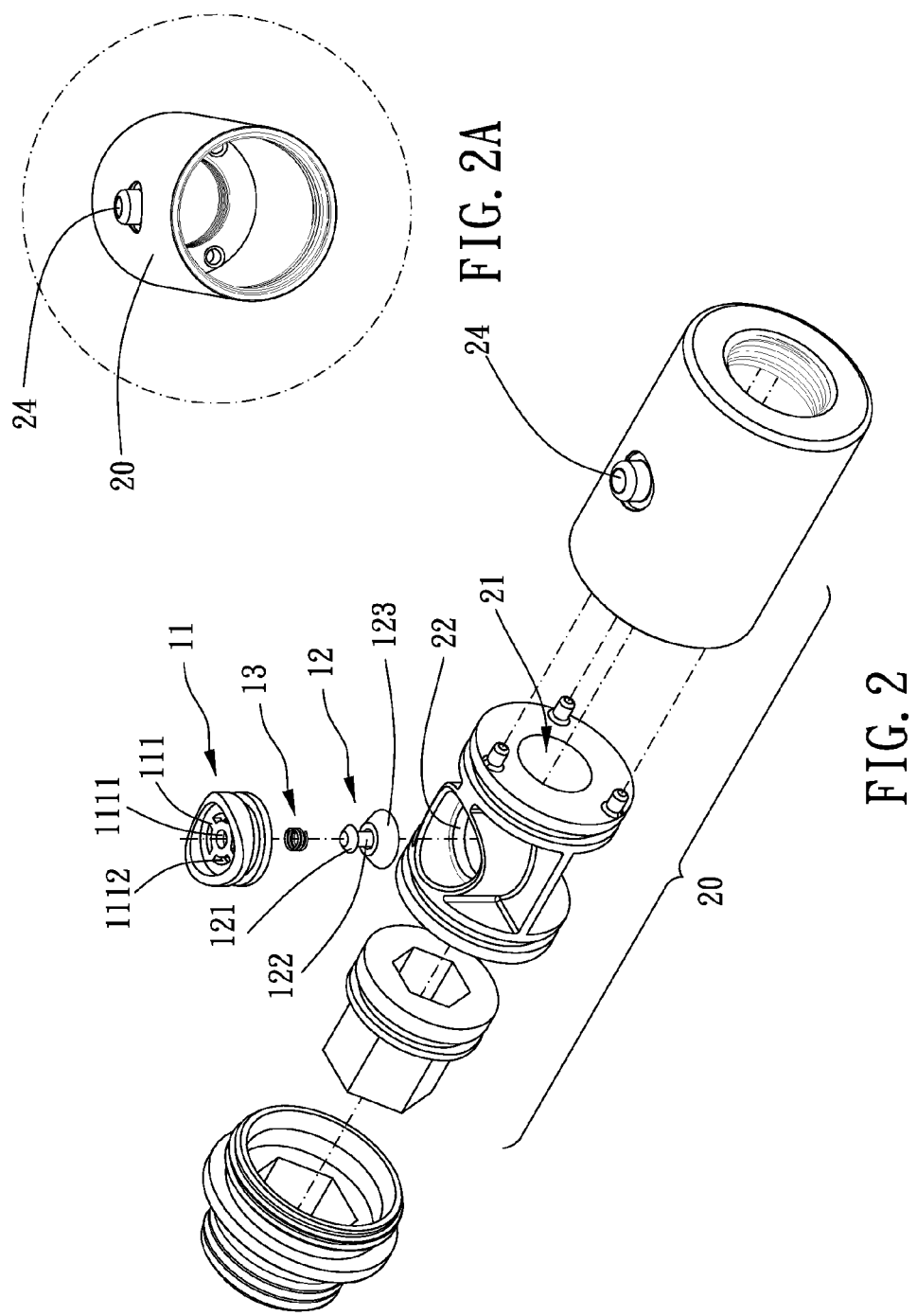

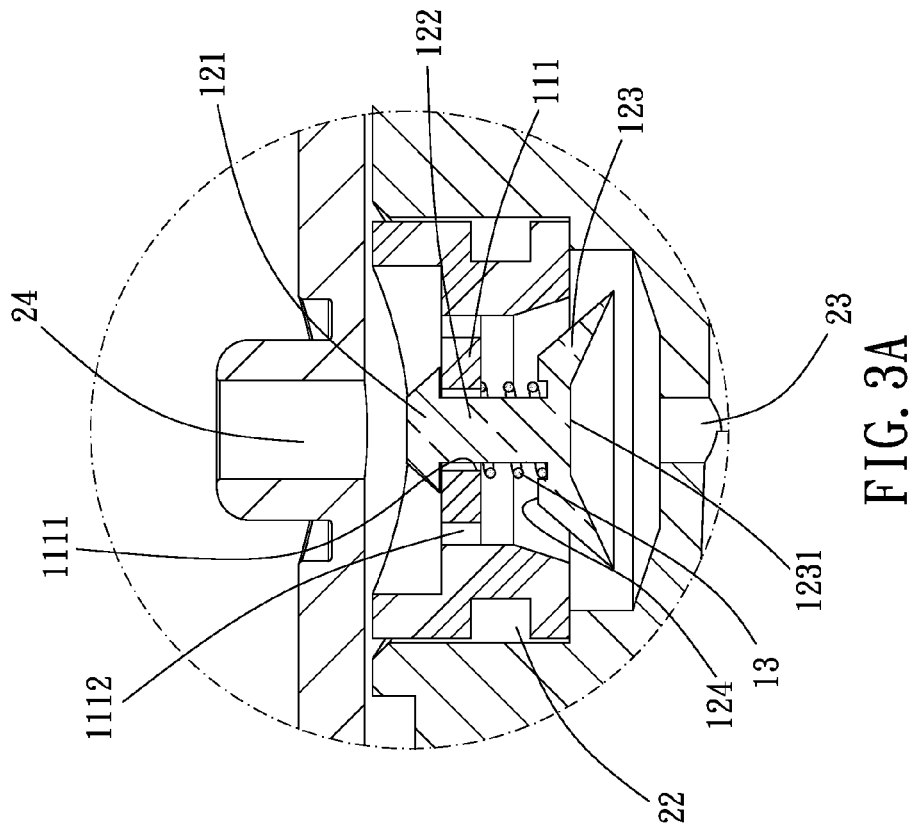
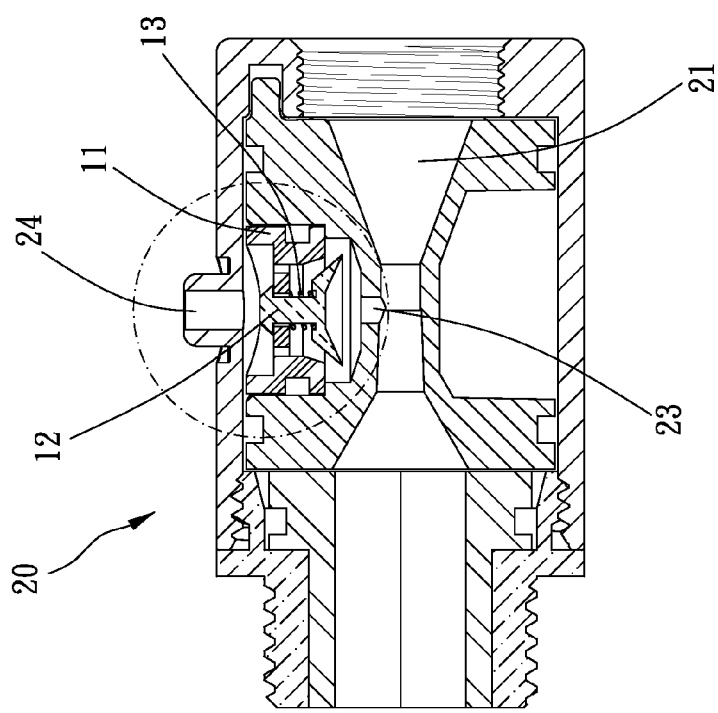
FIG. 3A
FIG. 3

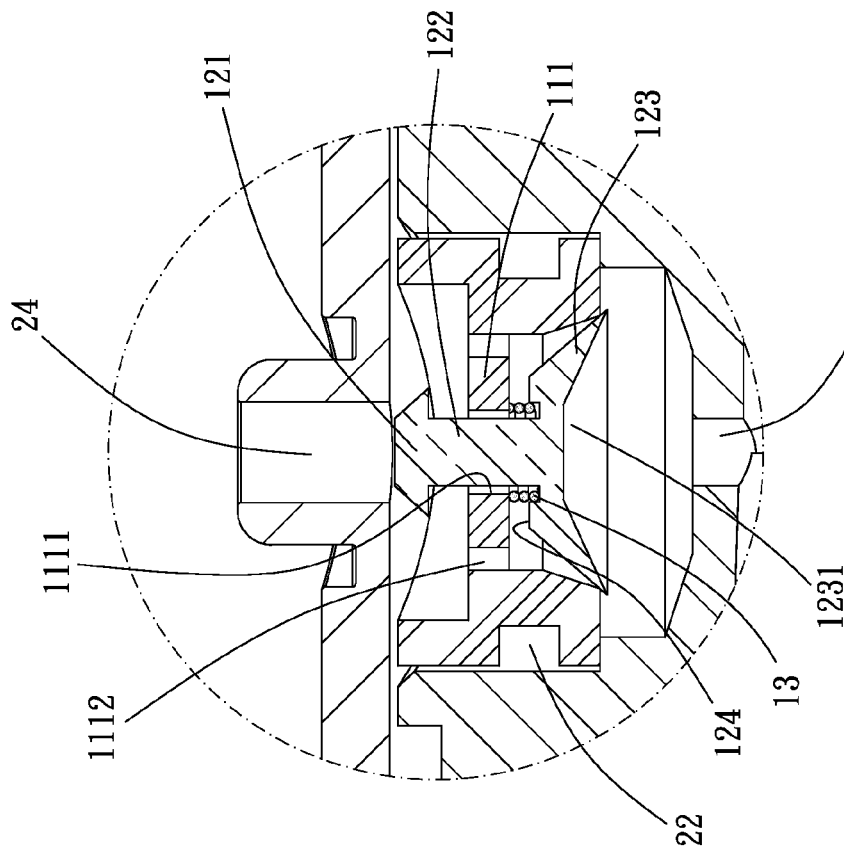
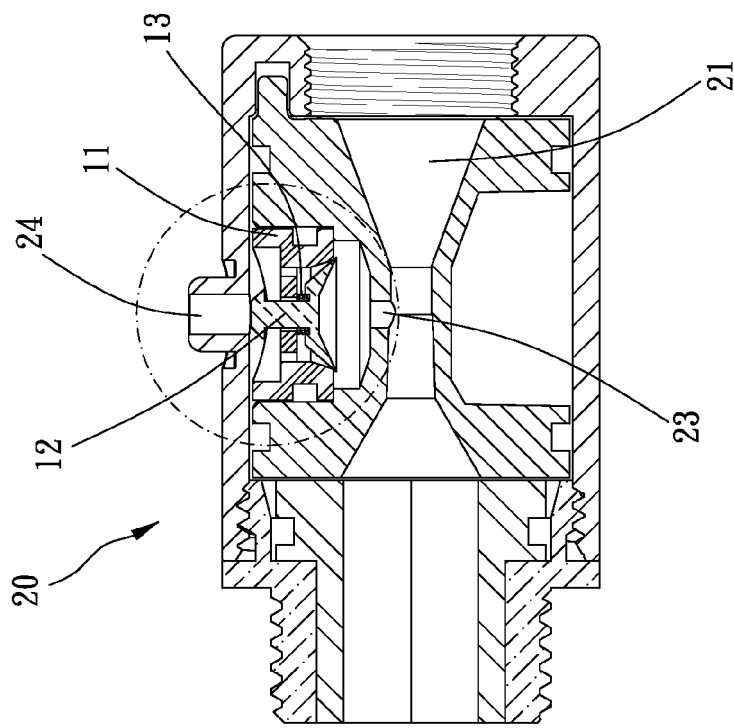

GAS INJECTION DEVICE HAVING CHECK VALVE

BACKGROUND OF THE INVENTION

1. Field of the Invention

The present invention relates to a gas injection device having check valve.

2. Description of the Prior Art

A proper amount of ozone has the function of sterilization, deodorization and anti-oxidation; therefore, there are many ozone-adding devices in the market. The ozone-adding devices can be assembled on faucets to add ozone into the water in the tube.

Generally, the ozone-adding device disclosed in TW M365537 includes a venturi tube, and a hole is formed on a narrower part of an inner diameter of the venturi tube. The hole is connected with a gas-providing device. Through the effect of the venturi tube, gas is sucked and mixed with water, wherein the gas-providing device or gas manufacturing device are usually sensitive to water, if water flows reversely to the gas-providing device, the gas-providing device may be damaged. Therefore, a check valve is often disposed between the gas-providing device and the venturi tube to prevent water from flowing reversely to the gas-providing device.

The check valve disclosed in the above-mentioned prior art is normally closed, that is, gas provided by the gas-providing device has to overcome elasticity of an elastic member and push away a rolling bead so as to enter the venturi tube. Check valve which is normally closed has better non-return effect; however, gas needs to have proper pressure to push away the rolling bead. When the gas pressure is lower, gas cannot enter the venturi tube, and valve bodies with rolling bead cannot effectively prevent gas from leaking completely.

The present invention is, therefore, arisen to obviate or at least mitigate the above-mentioned disadvantages.

SUMMARY OF THE INVENTION

The main object of the present invention is to provide a gas injection device having check valve, which allows gas to be injected into flowing liquid under normal state and prevents liquid from flowing reversely to a gas-providing device when a hydraulic pressure is too high.

To achieve the above and other objects, the present invention provides a gas injection device having check valve, including a check valve and a shell body.

The check valve includes a main body, a valve body and an elastic member. Two corresponding ends of the main body are respectively formed with an inlet end and an outlet end. A separation plate is disposed between the inlet end and the outlet end. A center of the separation plate is formed with a through hole, and at least one flow hole is disposed on the separation plate around the through hole. The valve body includes a top section, a middle section and a bottom section hierarchically. The top section is disposed at the inlet end, the middle section is disposed through the through hole and the bottom section is disposed at the outlet end. An outer diameter of the top section and an outer diameter of the bottom section are respectively larger than an inner diameter of the through hole. The largest outer diameter of the bottom section is larger than a smallest inner diameter of an inner wall of the outlet end. A length of the middle section is longer than an axial length of the through hole. The elastic member is disposed around the middle section and abutted between the separation plate and the bottom section so as to bias the valve body toward the outlet end and make the bottom section of the valve body not close the outlet end of the main body under normal state, wherein when a water pressure on the bottom section of the valve body is higher than elasticity of the elastic member, the elastic member is compressed to make the bottom section of the valve body move toward the inlet end so as to close the outlet end of the main body and make the main body uncommunicated with space outside the outlet end.

The shell body has a flow channel, a receiving space, an outlet hole and an inlet hole. The flow channel is disposed through the shell body. The check valve of the gas injection device is disposed in the receiving space. The outlet hole communicates between the flow channel and the receiving space, and the inlet hole communicates between the receiving space and outside world for a gas to enter the inlet end of the main body from the inlet hole. The outlet end of the main body corresponds to the outlet hole, and an inner diameter of a part of the flow channel corresponding to the outlet hole is smaller than that of the rest of the flow channel.

Wherein the outer diameter of the bottom section of the valve body expands from an end near the middle section to the other end away from the middle end to be conical, the smallest outer diameter of the bottom section of the valve body is larger than the an outer diameter of the middle section to form a stepped face between the bottom section and the middle section, and the elastic member is abutted between the stepped face and the separation plate.

Thereby, because of elasticity of the elastic member, the valve body normally allows the gas to be injected into flowing liquid. When the water pressure is higher than elasticity, the valve body is pushed to close the main body so as to prevent water from flowing reversely into the gas-providing device and damaging the gas-providing device.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2 is perspective breakdown drawing of the present invention;

FIG. 2A is a stereogram of a shell body of the present invention viewing from another angle;

FIG. 3 is a cross-sectional view of the present invention under normal state;

FIG. 3A is a partially-enlarged view of FIG. 3;

FIG. 4 is a cross-sectional drawing of a valve body of the present invention when pushed by water pressure;

FIG. 4A is a partially-enlarged view of FIG. 4;

DETAILED DESCRIPTION OF THE PREFERRED EMBODIMENTS

Figure 1:
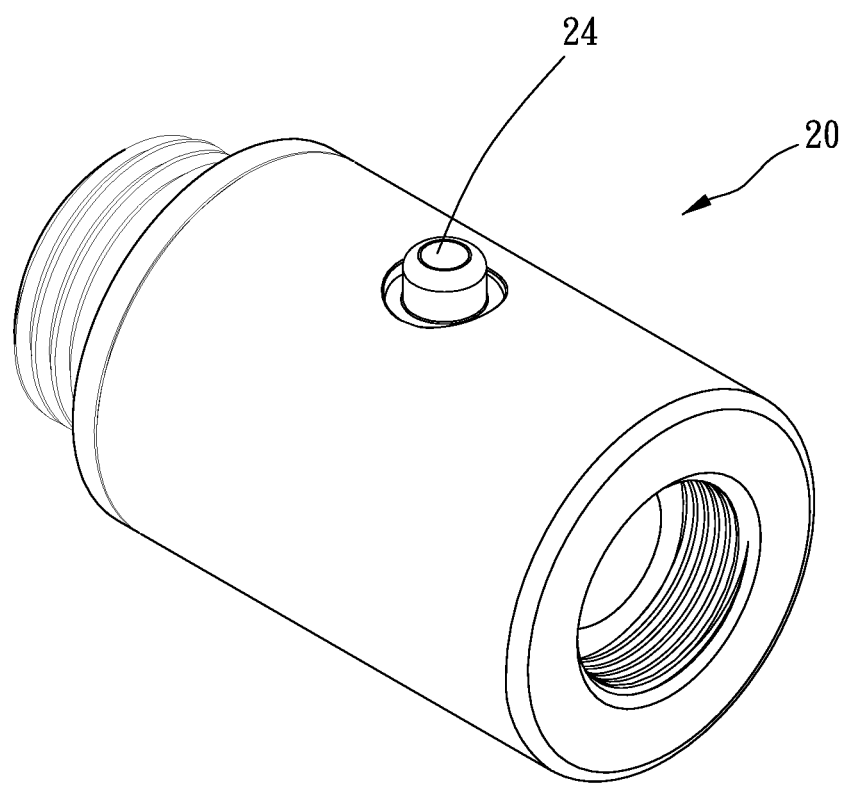
FIG. 1 is a stereogram of the present invention.

Please refer to FIGS. 1 to 4 and FIGS. 2A, 3A and 4A for a gas injection device having check valve of the present invention, including a main body 11, a valve body 12 and an elastic member 13.

Two corresponding ends of the main body 11 are respectively an inlet end and an outlet end, and a separation plate 111 is disposed between the inlet end and the outlet end. A center of the separation plate 111 is formed with a through hole 1111, and at least one flow hole 1112 is disposed on the separation plate 111 around the through hole 1111. The through hole 1111 and the flow hole 1112 communicate respectively with the inlet end and the outlet end.

The valve body 12 hierarchically includes a top section 121, a middle section 122 and a bottom section 123. The top section 121 is disposed at the inlet end, the middle section 122 is disposed through the through hole 1111, and the bottom section 123 is disposed at the outlet end. A largest outer diameter of the top section 121 and a largest outer diameter of the bottom section 123 are respectively larger than an inner diameter of the through hole 1111, and the largest outer diameter of the bottom section 123 is larger than a smallest inner diameter of an inner wall of the outlet end. A length of the middle section 122 is longer than an axial length of the through hole 1111. More specifically, the valve body 12 is made of pliable material. The outer diameter of the bottom section 123 of the valve body 12 expands from an end near the middle section 122 to the other end away from the middle section 122 to be conical. The smallest outer diameter of the bottom section 123 of the valve body is larger than the outer diameter of the middle section 122 so as to form a stepped face 124 between the bottom section 123 and the middle section 122. Preferably, a concave groove 1231 is disposed at an end of the bottom section 123 opposite to the middle section 122, and the bottom section 123 is in a conical plate shape. In addition, the outer diameter 121 of the valve body is conically tapered from an end near the middle section 122 to the other end away from the middle section 122. The largest outer diameter of the bottom section 123 is larger than the largest inner diameter of the inner wall of the outlet end. Preferably, the outlet end of the main body 11 is formed with a conical passage, and an inner diameter of the conical passage expands from an end near the separation plate 111 to the other end away from the separation plate 111.

The elastic member 13 is disposed through the middle section 12 and abutted between the separation plate 111 and the bottom section 123 to bias the valve body 12 toward the outlet end so as let the bottom section 123 of the valve body not close the outlet end of the main body 11 under normal state. In practice, the elastic member 13 can be a spring, wherein when a water pressure put on the bottom section 123 of the valve body is higher than elasticity of the elastic member 13, the elastic member 13 is compressed to move the bottom section 123 of the valve body toward the inlet end so as to close the outlet end of the main body 11 and further to make the main body 11 uncommunicated with a space outside the outlet end. In the main embodiment of the present invention, the elastic member 13 is abutted between the stepped face 124 of the valve body and the separation plate 111. Preferably, an annular groove is recessed on the stepped face 124, and an end of the elastic member 13 is disposed in the annular groove.

It is to be noted that as shown in FIGS. 3, 3A, 4 and 4A, the largest outer diameter (an outer diameter of the most distal end) of the bottom section 123 of the valve body is larger than the largest inner diameter of the outlet end; therefore, when the water pressure put on the valve body 12 is higher than elasticity of the elastic member 13, the bottom section 123 of the valve body is abutted against the outlet end with its outer wall to make the inside of the main body uncommunicated with the outside of the outlet end. In addition, the largest diameter of the top section 121 of the valve body is larger than the inner diameter of the through hole 1111. Under normal state, the valve body 12 tends to move downward due to elasticity of the elastic member 13. Then, the top section 121 of the valve body is abutted against the separation plate 111 to prevent the valve body 12 from falling.

The present invention provides a gas injection device having check valve, in addition to the check valve, further including a shell body 20. The shell body 20 has a flow channel 21, a receiving space 22, an outlet hole 23 and an inlet hole 24. The flow channel 21 is disposed through the shell body 20. The gas injection device having check valve is disposed in the receiving space 22. The outlet hole 23 communicates between the flow channel 21 and the receiving space 22, and the inlet hole 24 communicates between the receiving space 22 and outside to allow a gas to enter the inlet end of the main body 11 from the inlet hole 24. The outlet end of the main body 11 corresponds to the outlet hole 23, and the inner diameter of a part of the flow channel 21 corresponding to the outlet hole 23 is smaller than the inner diameter of the rest of the flow channel 21. More specifically, two ends of the shell body 20 on an axial direction are respectively formed with an inflow end and an outflow end. The flow channel 21 extends axially from the inflow end to the outflow end, and the outlet hole 23 is disposed between the inflow end and the outflow end. The inner diameter of a part of the flow channel 21 corresponding to the outlet hole 23 is smaller than that of the rest of inner diameter of the flow channel 21 corresponding to the inflow end and the outflow end. Due to the effect of venturi tube, a liquid flows into the shell body 20 from the inflow end. When the liquid passes near the outlet hole 23, the liquid sucks the gas inside the main body 11 and carries the gas to flow out of the outflow end. Thereby, the liquid flowing out is mixed with specific gases, such as ozone.

Figure 5A:
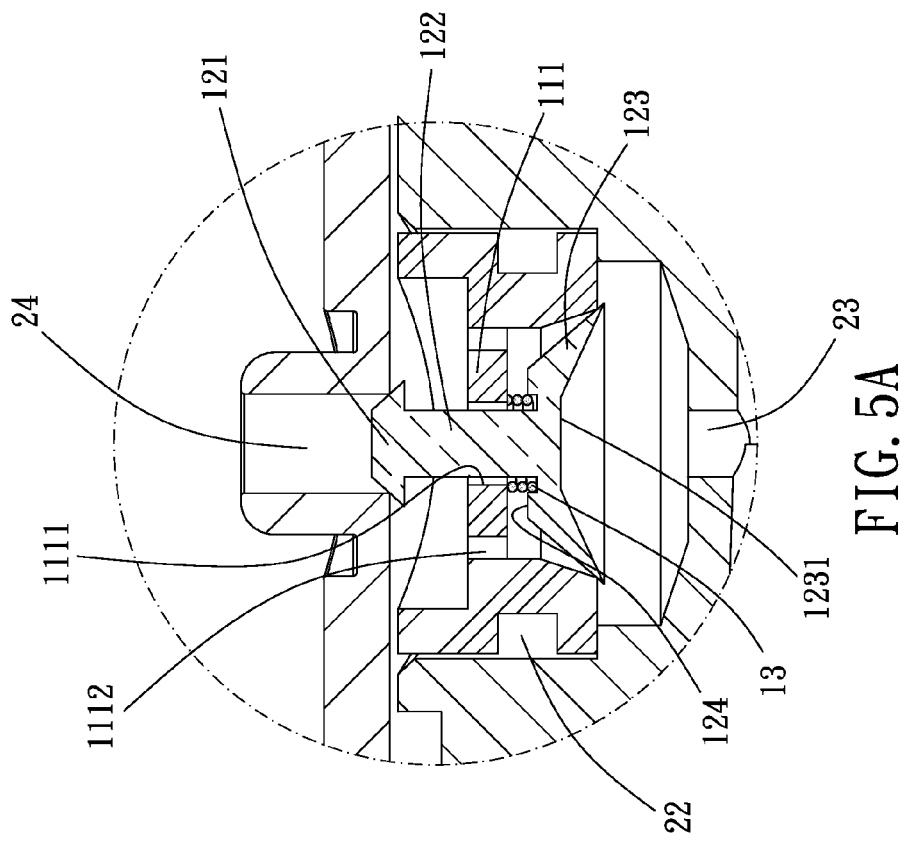
FIG. 5A is a partially-enlarged drawing of FIG. 5.
Figure 5:
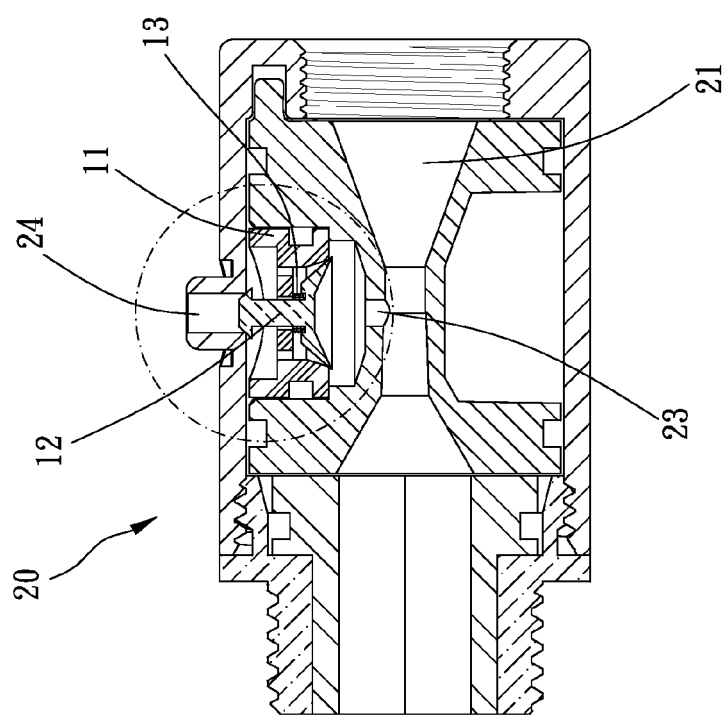
FIG. 5 is a cross-sectional drawing of the valve body of a second embodiment of the present invention when pushed by water pressure.

Preferably, the largest outer diameter of the top section 121 of the valve body 12 is larger than the inner diameter of the inlet hole 24. When the valve body moves upward, the outer wall of the top section 121 of the valve body is abutted against a mouth of the inlet hole 24 to close the inlet hole 24 as shown in FIGS. 5 and 5A. In other words, when the water pressure is higher than elasticity of the elastic member 13, the valve body 12 moves toward the inlet end to make the outer wall of the bottom section 123 of the valve body 12 be abutted against the mouth of the outlet end or the inner wall of the outlet end so as to close the mouth of the outlet end. At the same time, the outer wall of the top section 121 of the valve body is abutted against the mouth of the inlet hole 24 to close the mouth of the inlet hole. Therefore, the inlet hole 24 and the outlet end can both be closed by the valve body 12 and can act as a double-action barrier to prevent the liquid from flowing reversely into the main body 11 and the gas-providing device.

In practice, the shell body can be disposed between two pipes, and the inflow end and the outflow end are respectively connected with the two pipes. For example, the shell body can be disposed between the pipes and the faucets, and the inlet hole can be connected with a gas-providing device, such as an ozone-manufacturing device. When water flows into the flow channel from the inflow end and passes the outlet hole, the gas provided by the gas-providing device is sucked and carried by water and flow out of the outflow end with water; therefore, water flowing out can carry the gas which a user wants to add. In addition, when the water pressure is too high, the valve body will be pushed to close the outlet end and the inlet hole; therefore, water will not flow reversely from the main body to the gas-providing device, and gas-providing device will not be damaged. Furthermore, the valve body is normally open, so the gas is easy to be sucked and introduced into water without a large air pressure.

It is to be noted that in the main embodiment and Figs. of the present invention, when the valve body is pushed by the water pressure, the bottom section of the valve body is abutted against the mouth of the outlet end; however, in other embodiments, because the bottom section has the concave groove, the bottom section is formed with an elastic lip in a conical plate shape. The lip can be transformed and compressed into the outlet end to abut closely against the inner wall of the outlet end so as to achieve air-tight effect.

Through the structure mentioned above, the present invention can provide gas smoothly, and gas can be sucked into water even when the water pressure is lower. In addition, two-phase non-return structure can effectively prevent liquid from flowing reversely to the gas-providing device and damaging the gas-providing device.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gas injection device having check valve, including:
a check valve, having a main body, a valve body and an elastic member, two corresponding ends of the main body being an inlet end and an outlet end, a separation plate disposed between the inlet end and the outlet end, a center of the separation plate formed with a through hole, at least one flow hole disposed on the separation plate around the through hole, the valve body having a top section, a middle section and a bottom section, the top section positioned at the inlet end, the middle section disposed through the through hole, the bottom section positioned at the outlet end, an outer diameter of the top section and an outer diameter of the bottom section being larger than an inner diameter of the through hole, the largest diameter of the bottom section being larger than the smallest inner diameter of an inner wall of the outlet end, a length of the middle section being longer than an axial length of the through hole, the elastic member disposed around the middle section and abutted between the separation plate and the bottom section so as to bias the valve body toward the outlet end and make the bottom section of the valve body not close the outlet end of the main body under normal state, wherein when a water pressure on the bottom section of the valve body is greater than elasticity of the elastic member, the elastic member is compressed to make the bottom section of the valve body move toward the inlet end so as to close the outlet end of the main body and make the main body uncommunicated with a space outside the outlet end;
a shell body, having a flow channel, a receiving space, an outlet hole and an inlet hole, the flow channel disposed through the shell body, the check valve of the gas injection device disposed in the receiving space, the outlet hole communicating between the flow channel and the receiving space, the inlet hole communicating between the receiving space and outside world for a gas to enter the inlet end of the main body from the inlet hole, the outlet end of the main body corresponding to the outlet hole, an inner diameter of a part of the flow channel corresponding to the outlet hole being smaller than that of the rest of the flow channel;
wherein the outer diameter of the bottom section of the valve body expands from an end near the middle section to the other end away from the middle section to be conical, the smallest outer diameter of the bottom section of the valve body is larger than an outer diameter of the middle section so as to form a stepped face between the bottom section and the middle section, and the elastic member is abutted between the stepped face and the separation plate.

2. The gas injection device having check valve of claim 1, wherein the valve body is made of pliable material.

3. The gas injection device having check valve of claim 1, wherein an end of the bottom section of the valve body opposite to the middle section is recessed with a concave groove to make the bottom section be in a conical plate shape.

4. The gas injection device having check valve of claim 1, wherein the outer diameter of the top section of the valve body is conically tapered from an end near the middle section to the other end away from the middle section, the largest diameter of the top section is larger than the inner diameter of the inlet hole, and when the valve body moves upward, the outer wall of the top section of the valve body is abutted against an opening of the inlet hole to close the inlet hole.

5. The gas injection device having check valve of claim 1, wherein the largest outer diameter of the bottom section is larger than the largest inner diameter of the inner wall of the outlet end of the main body.

6. The gas injection device having check valve of claim 1, wherein the outlet end of the main body is formed with a conical channel, and the inner diameter of the conical channel expands from an end near the separation plate to the other end away from the separation plate.

* * * * *